Patented June 30, 1931

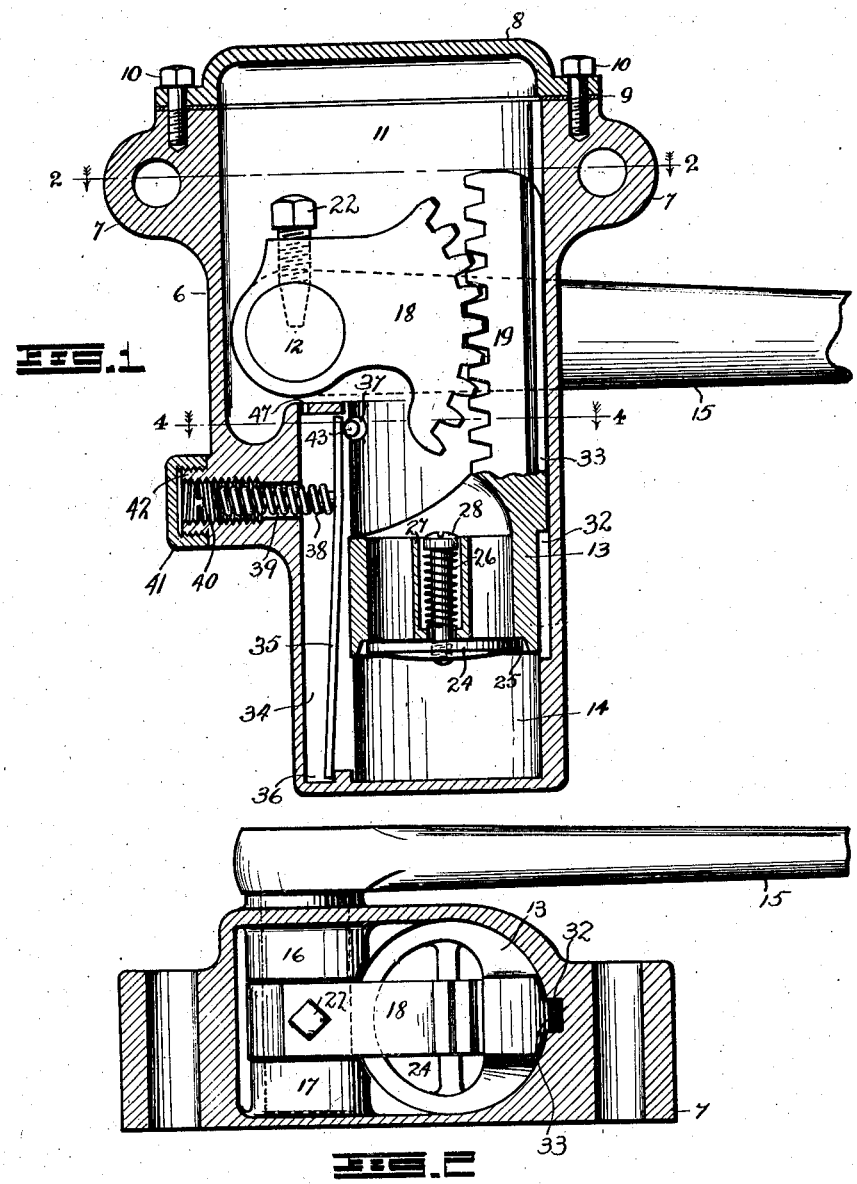
June 30, 1931. J. A. KNIGHT 1,812,051
SHOCK ABSORBER
Filed May 28, 1928 2 Sheets-Sheet 1

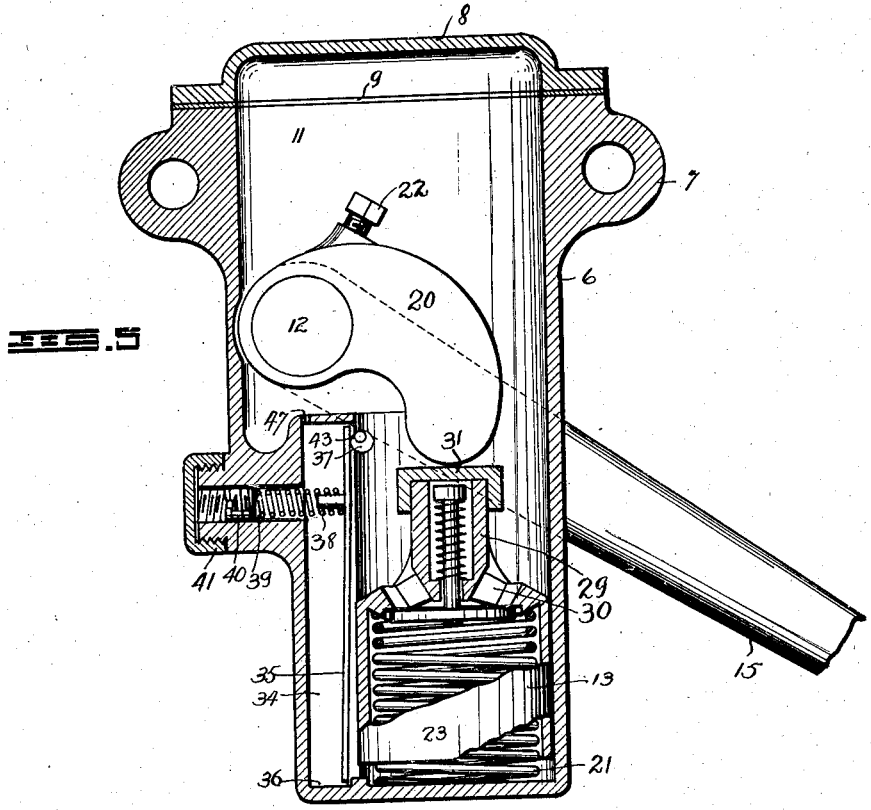
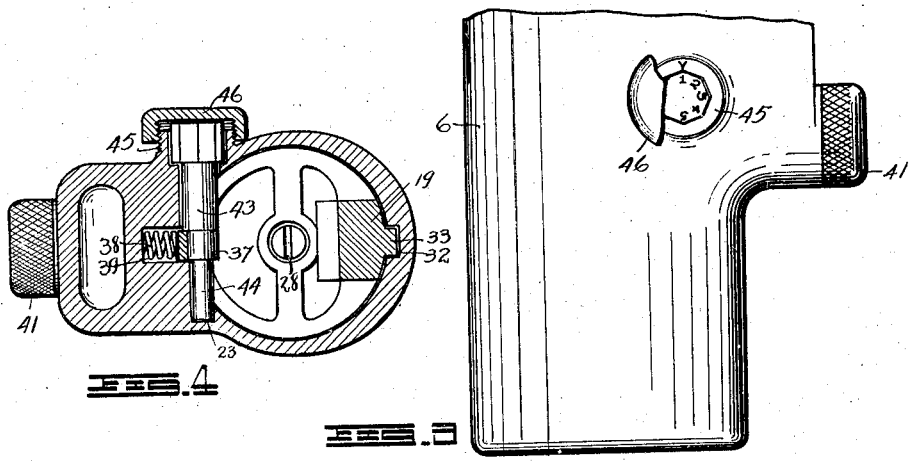

1,812,051

UNITED STATES PATENT OFFICE

JAMES A. KNIGHT, OF HALIFAX, NOVA SCOTIA, CANADA

SHOCK ABSORBER

Application filed May 28, 1928. Serial No. 281,076.

This invention relates to shock absorbers as ordinarily used in connection with automotive vehicle springs and more particularly to that type known as "hydraulic" controllers, which are used to prevent the sudden rebound of the springs and which consists mainly of a piston in a cylinder filled with oil, the piston having free movement in one direction and retarded movement in the other.

The main object of the invention is to provide a device of the class mentioned wherein the amount of control of the spring rebound will vary in accordance with the amount of pressure exerted by the same. In other words, if the spring is flexed slightly, the rebound will be small and consequently light control is necessary. If, however, the spring is flexed to the limit, the rebound will be great and high control will be required. My device will automatically apply the proportionate amount of checking at all points under the above conditions.

Another object of my invention is to provide a device of this class which will give the amount of cushioning required.

A further object of my invention is to provide means in a shock absorber of this class whereby adjustment can easily be made to allow for the viscosity of the liquid under varing temperatures.

Other objects as well as advantages will become apparent by following the description hereinafter, in connection with the appended drawings, which show two types of shock absorbers made according to my invention.

In the drawings:

Figure 1 is a sectional elevation of my shock absorber of the geared lever type;

Figure 2 is a cross sectional top view taken on line 2—2 of Figure 1;

Figure 3 is a fragmentary side view of the absorber showing the means of regulation according to the viscosity of the liquid therein;

Figure 4 is a cross sectional top view taken on line 4—4 of Figure 1; and

Figure 5 is a sectional elevation of my shock absorber of the cam lever type.

Similar characters of reference refer to similar or corresponding parts throughout the views.

Both types illustrated comprise a similar casing 6 provided with perforated ears 7 for suitably mounting the same. The casing is closed at its top by a cover 8 provided with a gasket 9 to prevent leakage of oil and held in place by cap screws 10. The upper portion 11 is enlarged in order to allow the mounting of the arm shaft 12 sufficiently distant from the axis of piston 13 to provide the required leverage. The lower part of the casing is in the form of a cylinder 14 which receives piston 13.

The casing is intended to be mounted to the frame of the vehicle. The end of the arm 15 is connected to the spring or axle by means of a strap or pivoted rod, not shown. In both types, the arm 15 is integral with or is rigidly fastened to shaft 12, which is mounted in bearings 16 and 17. In Figure 1, connection between the shaft 12 and the piston is by means of a segment gear 18 meshing with a rack 19 integral with the piston. In the design shown in Figure 5, connection between shaft 12 and the piston is by means of an eccentric lever 20, which presses on the piston head. As this connection is not positive, a spring 21 is necessary to raise the piston. Both the lever 20 and segment gear 18 are suitably keyed to shaft 12 or rigidly held by a set screw 22, as shown.

The piston shown in Figure 1 consists of a cylinderlike member closed at its bottom by a valve 24 which is held against a seat 25 by a spring 26 mounted on a stem 28 secured to valve 24, the spring being enclosed in a cylindrical chamber 27 integral with the piston, as shown. A somewhat similar arrangement is employed in Figure 5 excepting that the valve is positioned at the top of the piston and the spring held in the head 29. The inside of the piston is cupshaped so as to receive spring 21. Ports 30 are provided to allow the free passage of fluid on the upward movement. A hardened cap 31 is mounted over the head of the piston to form a bearing surface for lever 20.

In Figure 1 the casing has a groove 32 in which a tongue 33, integral with rack 19, slides. This will keep the gear 18 and rack 19 in proper mesh and alinement.

On the downward movement of the piston, the liquid, usually oil, contained in the casing is forced through a by-pass consisting of a groove or slot 34 in the wall of the cylinder. The amount of resistance offered in the said by-pass governs the amount of check. The means to cause said resistance consists in so mounting a plate 35 in groove 34 as to limit the passage of oil. The lower end of plate 35 plays in a space 36, while the upper end rests against a cam 37 and is held thereagainst by means of a spring 38 mounted in a bore 39, the spring being adjustable by means of a screw 40 threaded into bore 39. This bore is closed by a cap 41 threaded on the end thereof, which is in the form of a nipple 42 integral with the casing.

The shaft 43, carrying cam 37, has two diameters. The smaller diameter 44 is mounted in a perforation 23; and the larger diameter passes through the casing. With such a construction it will be apparent that the cam can be easily withdrawn from the casing. In order to adjust the face of the cam to regulate the position of plate 35, the outer end of shaft 43 is provided with polygonal faces received in a congruous nipple 45 integral with the casing. To adjust the cam, the shaft is withdrawn until the faced portion is disengaged and re-inserted to obtain the required position. The outer face of shaft 43 may have figures or other marks to indicate the actual position of the cam with relation to the plate 35. Shaft 43 is held in place by a cap 46 threaded over nipple 45. A small opening 47 at the top of groove 34 provides an outlet for the liquid that may leak back of plate 35 so as to allow the free movement of the latter. It will be understood that a fair fit is required between plate 35 and the walls of groove 34 to prevent excess leakage of oil.

The three adjustments above described render my device especially adaptable to any existing or operating conditions.

It will be noted that plate 35 is at an angle with the cylinder substantially from the point where it is held by spring 38. This causes the space for oil circulation to increase with the descent of the piston, and vice versa. When at the top of the cylinder, the piston practically closes the space. This will evidently give a great checking action to a vehicle spring flexed to a high degree but will allow a very light checking on quick jerks. The increasing allowance for the passage of oil as the piston descends will prevent hard riding as it will allow the spring to flex for cavities in the surface of the road.

In order to obtain the required space between the plate and the piston for a given load, the position of the piston will be determined by proper adjustment of the connecting strap or rod, as the case may be. The angle of the plate, however, is adjustable by means of cam 37 so as to give the desired proportional checking. Owing to the higher viscosity of the oil in cold weather, more space will be required and this is obtained by regulating the cam to compensate accordingly.

Exceedingly sudden and extraordinary jerks which cause hard riding with the use of shock absorbers of the present type are oviated with my device by cushioning means which consist in allowing the plate to be depressed in whole or endwise as required so as to afford a freer passage of oil. This desideratum is obtained by spring 38, which is mounted to press on plate 35 and is adjustable by a screw 40 to suit various vehicle springs and loads. This spring being located substantially at the top of the plate will give the desired proportional cushioning at the lower end of the cylinder. The return of the piston to normal is obtained by the free passage of the oil through valve 24, common in the art.

While I have described my invention strictly in accordance with the embodiment shown in the drawings, it must be understood that many departures from the said drawings may be made without exceeding the spirit of my invention as covered by the scope of the following claims:

I claim as new and useful, and desire to secure by Letters Patent:—

1. In a shock absorber of the class described, a fluid containing cylinder, a piston mounted therein, a longitudinal slot in the side of the cylinder to form a by-pass communicating with opposite sides of said piston, a movable plate adjacent said slot, said plate forming a gradual incline to vary the area of the by-pass, and resilient means to hold said plate in position.

2. In a device of the class described, a fluid containing cylinder, a piston therein, a longitudinal slot in the side of said cylinder, an adjustable plate mounted in said slot, means to adjust said plate to vary the area of the by-pass, and resilient means to maintain said plate in adjusted position.

3. In a device of the class described, a fluid containing cylinder, a piston therein, a by-pass leading to both sides of the piston, an adjustable plate mounted adjacent said by-pass so as to incline towards the bottom of the cylinder, means to adjust said plate to vary the area of the by-pass, and resilient means to maintain said plate in adjusted position.

4. In a device of the class described, a fluid containing cylinder, a piston in said cylinder, a longitudinal slot in the side of said cylinder, a movable plate located adjacent said slot, means to maintain said plate in inclination, means to adjust the upper end of said plate so as to regulate the area of the by-pass, and resilient means back of said plate to maintain the same in adjusted position.

5. In a device of the class described, a fluid containing cylinder, a piston mounted therein, a longitudinal slot in the side of said cylinder forming a by-pass connecting the opposite sides of the piston, a plate mounted in said slot so that the cross area of the by-pass will be greatest at the bottom of the cylinder, the area of the by-pass gradually diminishing upwardly, means for adjusting the plate within the slot to vary the area of the by-pass, and resilient means mounted back of said plate to maintain the same in adjusted position but to allow displacement upon excessive pressure of the fluid in the cylinder.

6. In a device of the class described, a fluid-containing cylinder, a piston mounted therein, a longitudinal slot in the side of said cylinder forming a by-pass connecting the opposite sides of the piston, a plate mounted in said slot so that the cross area of the by-pass will be equal for a portion of its length and gradually increasing downwardly for the remaining portion thereof, means for adjusting the plate within the slot to vary the area of the by-pass, and resilient means mounted back of said plate to maintain the same in adjusted position but to allow displacement upon excessive pressure of the fluid in the cylinder.

7. In a device of the class described, a fluid-containing cylinder, a piston mounted to travel therein, a longitudinal recess in the side of said cylinder, a plate mounted to move laterally in said recess, means to adjust the normal position of said plate, and resilient means to allow abnormal displacement of the plate on excessive rebounds.

8. A shock absorber, comprising a casing forming a cylinder at its lower end and an enlarged chamber at the upper end, a piston travelling in the cylinder, a recess extending longitudinally of said cylinder, forming a by-pass, an inclined plate mounted to move laterally in said recess so as to form a by-pass of uniform area for a portion of the upper end of the cylinder and of gradually increasing area down to the bottom of the cylinder, adjustable eccentric means to determine the area of the by-pass, adjustable resilient means mounted back of said plate to normally maintain the same in position but to give upon abnormal rebounds, ports through said cylinder, a valve to close said ports when the piston is moving downwardly and to open them upon the upward movement thereof so as to allow free passage of the fluid, a rack bar carried by said piston, a segment gear in mesh therewith, a shaft carrying said gear, an arm mounted on said shaft positioned outside of said casing.

9. A device as stated in claim 7, having an outlet to allow the escape of oil that may find its way back of the plate.

In testimony of the foregoing, I have hereto affixed my signature, this 16th day of May, 1928, at the city of Halifax, Nova Scotia, Canada.

J. A. KNIGHT.